US012675406B2

(12) United States Patent
Qi et al.

(10) Patent No.: US 12,675,406 B2
(45) Date of Patent: Jul. 7, 2026

(54) CACHING POLICY TO CACHE KEY-VALUE VECTORS

(71) Applicant: International Business Machines Corporation, Armonk, NY (US)

(72) Inventors: Haode Qi, Cambridge, MA (US); Gengyu Wang, Long Island City, NY (US); Juergen Bross, New York, NY (US); Ladislav Kunc, Cambridge, MA (US); Nicholas James Hill, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

(21) Appl. No.: 18/607,789

(22) Filed: Mar. 18, 2024

(65) Prior Publication Data
US 2025/0291722 A1 Sep. 18, 2025

(51) Int. Cl.
*G06F 12/0802* (2016.01)

(52) U.S. Cl.
CPC ............................... *G06F 12/0802* (2013.01)

(58) Field of Classification Search
CPC ................................................. G06F 12/0802
See application file for complete search history.

(56) References Cited

U.S. PATENT DOCUMENTS

| | | | | |
|---|---|---|---|---|
| 8,274,562 B2 * | 9/2012 | Walter | ................. | B60S 1/0844 |
| | | | | 382/104 |
| 9,176,941 B2 | 11/2015 | Xiao | | |
| 2013/0194589 A1 * | 8/2013 | Suzuki | ................. | H04N 1/58 |
| | | | | 358/1.2 |

(Continued)

FOREIGN PATENT DOCUMENTS

| | | |
|---|---|---|
| CN | 117056515 A | 11/2023 |
| CN | 117093679 A | 11/2023 |
| CN | 117194056 A | 12/2023 |

OTHER PUBLICATIONS

Kwon et al , Efficient Memory Management for Large Language Model Serving with PagedAttention, 2023 (Year: 2023).*

(Continued)

*Primary Examiner* — Kevin Ky

(74) *Attorney, Agent, or Firm* — Amin, Turocy & Watson, LLP

(57) ABSTRACT

One or more systems, devices, computer program products and/or computer-implemented methods of use provided herein relate to caching key-value vectors for fixed prefixes according to a caching policy. A system can comprise a memory that can store computer-executable components. The system can further comprise a processor that can execute the computer-executable components stored in the memory, wherein the computer-executable components can comprise an accessing component that can access a request comprising a fixed prefix and variable data. The system can further comprise a storage component that can selectively store in a cache, one or more key-value vectors generated via processing of the fixed prefix by a large language model (LLM), based on a temporal moving average of the fixed prefix being greater than a first defined threshold, according to a smart encoding policy.

20 Claims, 10 Drawing Sheets

(56)        References Cited

U.S. PATENT DOCUMENTS

| | | | |
|---|---|---|---|
| 2013/0335461 A1* | 12/2013 | Rekimoto | G02B 27/0172 |
| | | | 345/694 |
| 2014/0136970 A1 | 5/2014 | Xiao | |
| 2020/0124851 A1* | 4/2020 | Higashiyama | B60K 35/23 |
| 2020/0195940 A1* | 6/2020 | Noorkami | G02B 27/0093 |
| 2022/0414528 A1* | 12/2022 | Chhibber | G06Q 20/401 |
| 2022/0414529 A1* | 12/2022 | Chhibber | G06N 20/00 |
| 2023/0064707 A1* | 3/2023 | Murakami | H04N 23/60 |
| 2024/0176663 A1* | 5/2024 | Hirisave Chandra Shekhara | |
| | | | G06F 9/5027 |
| 2024/0221275 A1* | 7/2024 | Narita | G06T 19/20 |
| 2025/0085134 A1* | 3/2025 | Sharifi | G01C 21/3679 |
| 2025/0291722 A1* | 9/2025 | Qi | G06N 3/0455 |

OTHER PUBLICATIONS

Fu et al, GPTCache: An Open-Source Semantic Cache for LLM Applications Enabling Faster Answers and Cost Savings, 2023 (Year: 2023).*

Xiang, et al. Prefix-Tuning: Optimizing Continuous Prompts for Generation. Jan. 2021.

Wan, et al. HISTALIGN: Improving Context Dependency in Language Generation by Aligning with History. Dec. 2023.

Stogiannidis, et al. Cache me if you Can: an Online Cost-aware Teacher-Student Framework to Reduce the Calls to Large Language Models. Oct. 2023.

Gim, et al. Prompt Cache: Modular Attention Reuse for Low-Latency Inference. Nov. 2023.

Past_key_value with multiple new tokens; https://discuss.huggingface.co/t/past-key-value-with-multiple-new-tokens/49177; Last accessed Mar. 12, 2024.

github.com. GPT Cache: A Library for Creating Semantic Cache for LLM Queries. https://github.com/zilliztech/GPTCache. Last accessed Mar. 12, 2024.

github.com. LangChain. https://github.com/langchain-ai/langchain. Last accessed Mar. 12, 2024.

github.com. Vllm Easy, fast, and cheap LLM serving for everyone. hhttps://github.com/vllm-project/vllm. Last accessed Mar. 12, 2024.

github.com. FasterTransformer GPT. https://github.com/NVIDIA/FasterTransformer/blob/f8e42aac45815c5be92c0915b12b9a6652386e8c/docs/gpt_guide.md. Last accessed Mar. 12, 2024.

* cited by examiner

PROMPT PREFIX:
YOU ARE A HELPFUL ASSISTANT FOR GRAMMAR CORRECTION. HERE IS AN EXAMPLE:

VARIABLE CONTENT:
NOW, GIVEN THIS PARAGRAPH, PLEASE HELP ME FIX ANY GRAMMAR ISSUES.

PROMPT 204

APPLICATION PROGRAMMING INTERFACE (API) CALL 402

OUTPUT 212

400

600

SMART
ENCODING
POLICY 604

STORAGE
COMPONENT 112

CACHE 602

KEY-VALUE
VECTORS 506

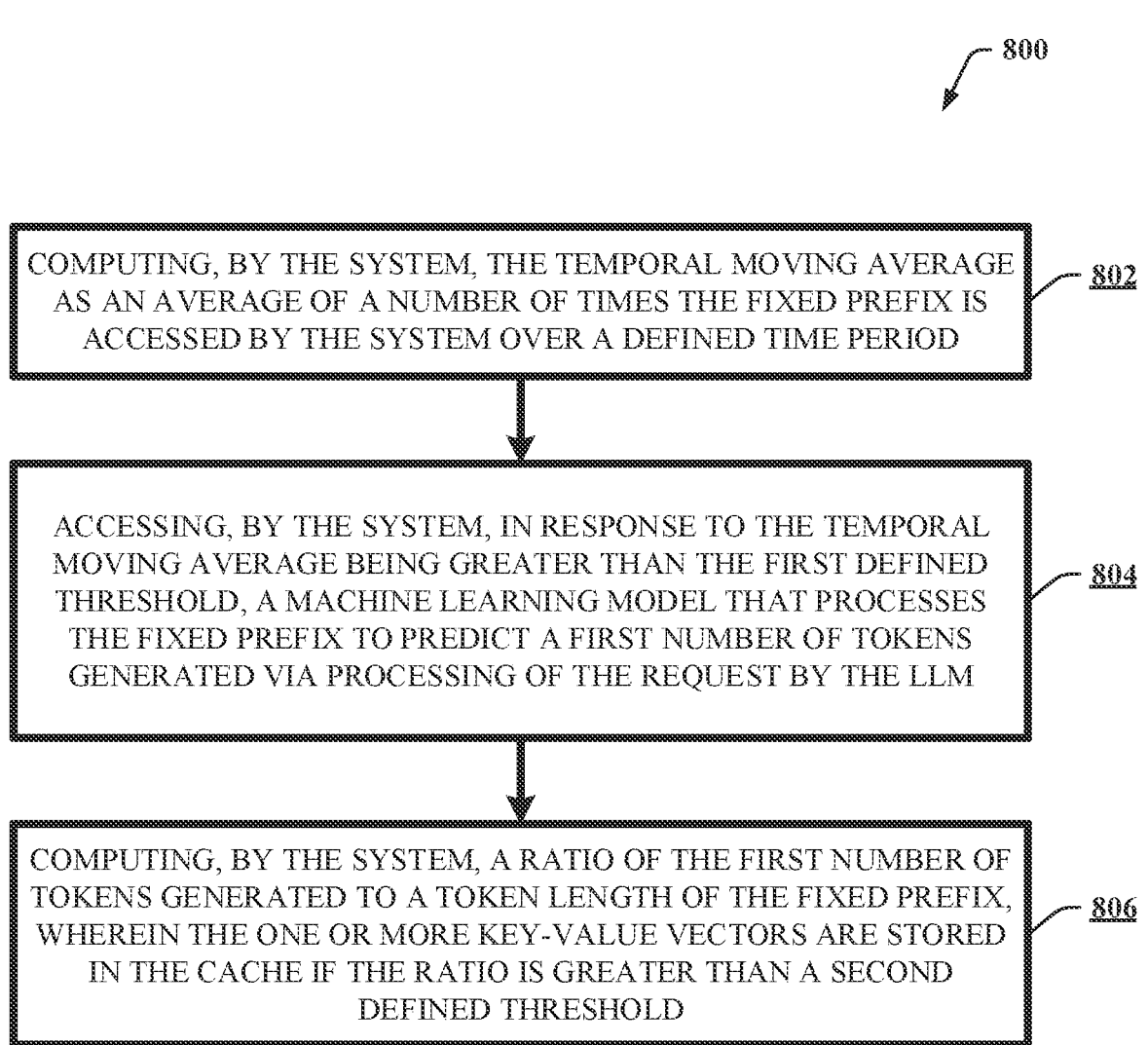

800

COMPUTING, BY THE SYSTEM, THE TEMPORAL MOVING AVERAGE AS AN AVERAGE OF A NUMBER OF TIMES THE FIXED PREFIX IS ACCESSED BY THE SYSTEM OVER A DEFINED TIME PERIOD — 802

ACCESSING, BY THE SYSTEM, IN RESPONSE TO THE TEMPORAL MOVING AVERAGE BEING GREATER THAN THE FIRST DEFINED THRESHOLD, A MACHINE LEARNING MODEL THAT PROCESSES THE FIXED PREFIX TO PREDICT A FIRST NUMBER OF TOKENS GENERATED VIA PROCESSING OF THE REQUEST BY THE LLM — 804

COMPUTING, BY THE SYSTEM, A RATIO OF THE FIRST NUMBER OF TOKENS GENERATED TO A TOKEN LENGTH OF THE FIXED PREFIX, WHEREIN THE ONE OR MORE KEY-VALUE VECTORS ARE STORED IN THE CACHE IF THE RATIO IS GREATER THAN A SECOND DEFINED THRESHOLD — 806

FIG. 8

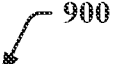

900

ACCESSING, BY THE SYSTEM, PAIRS OF DATA POINTS COLLECTED FOR A PREVIOUS REQUEST COMPRISING A PREVIOUS FIXED PREFIX AND PREVIOUS VARIABLE DATA, WHEREIN EACH PAIR OF DATA POINTS OF THE PAIRS OF DATA POINTS INCLUDES A FIRST DATA POINT REPRESENTING A TOKEN LENGTH OF THE PREVIOUS FIXED PREFIX AND A SECOND DATA POINT REPRESENTING A SECOND NUMBER OF TOKENS GENERATED VIA PROCESSING OF THE PREVIOUS REQUEST BY THE LLM

902

TRAINING, BY THE SYSTEM, THE MACHINE LEARNING MODEL WITH THE PREVIOUS FIXED PREFIX AS INPUT AND THE SECOND NUMBER OF TOKENS AS AN OUTPUT, WHEREIN THE MACHINE LEARNING MODEL IS A REGRESSION MODEL BUILT ON A SEQUENCE EMBEDDING MODEL

CACHING POLICY TO CACHE KEY-VALUE VECTORS

BACKGROUND

The subject disclosure relates to machine learning and, more specifically, to caching key-value vectors for prompt prefixes according to a caching policy.

Large language models (LLMs) are becoming popular as services for various natural language processing (NLP)-based tasks such as document summarization, text generation, etc. Such services ingest prompts comprising information that can be processed by one or more LLMs to generate responses. To generate responses to prompts, LLMs often employ attention techniques, where attentions are computed based on information comprised in the prompts, and key-value vectors that are numerical representations of the attentions are generated as part of the attention computations. However, attention computations can be expensive and prompts often comprise repeated data patterns.

The above-described background description is merely intended to provide a contextual overview regarding LLMs and key-value vectors and is not intended to be exhaustive.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products to cache key-value vectors for prompt prefixes according to a caching policy are discussed.

According to an embodiment, a system is provided. The system can comprise a memory that can store computer-executable components. The system can further comprise a processor that can execute the computer-executable components stored in the memory, where the computer-executable components can comprise an accessing component that can access a request comprising a fixed prefix and variable data. The computer-executable components can further comprise a storage component that can selectively store in a cache, one or more key-value vectors generated via processing of the fixed prefix by an LLM, based on a temporal moving average of the fixed prefix being greater than a first defined threshold, according to a smart encoding policy.

According to various embodiments, the above-described system can be implemented as a computer-implemented method or as a computer program product.

BRIEF DESCRIPTION OF THE DRAWINGS

One or more embodiments are described below in the Detailed Description section with reference to the following drawings:

FIG. 8 illustrates a flow diagram of an example, non-limiting method that can determine whether one or more key-value vectors for a fixed prefix can be stored in a cache in accordance with one or more embodiments described herein.

FIG. 9 illustrates a flow diagram of an example, non-limiting method that can train a machine learning model to predict a number of tokens generated by an LLM by processing a request comprising a fixed prefix and variable data in accordance with one or more embodiments described herein.

DETAILED DESCRIPTION

Figure 1:
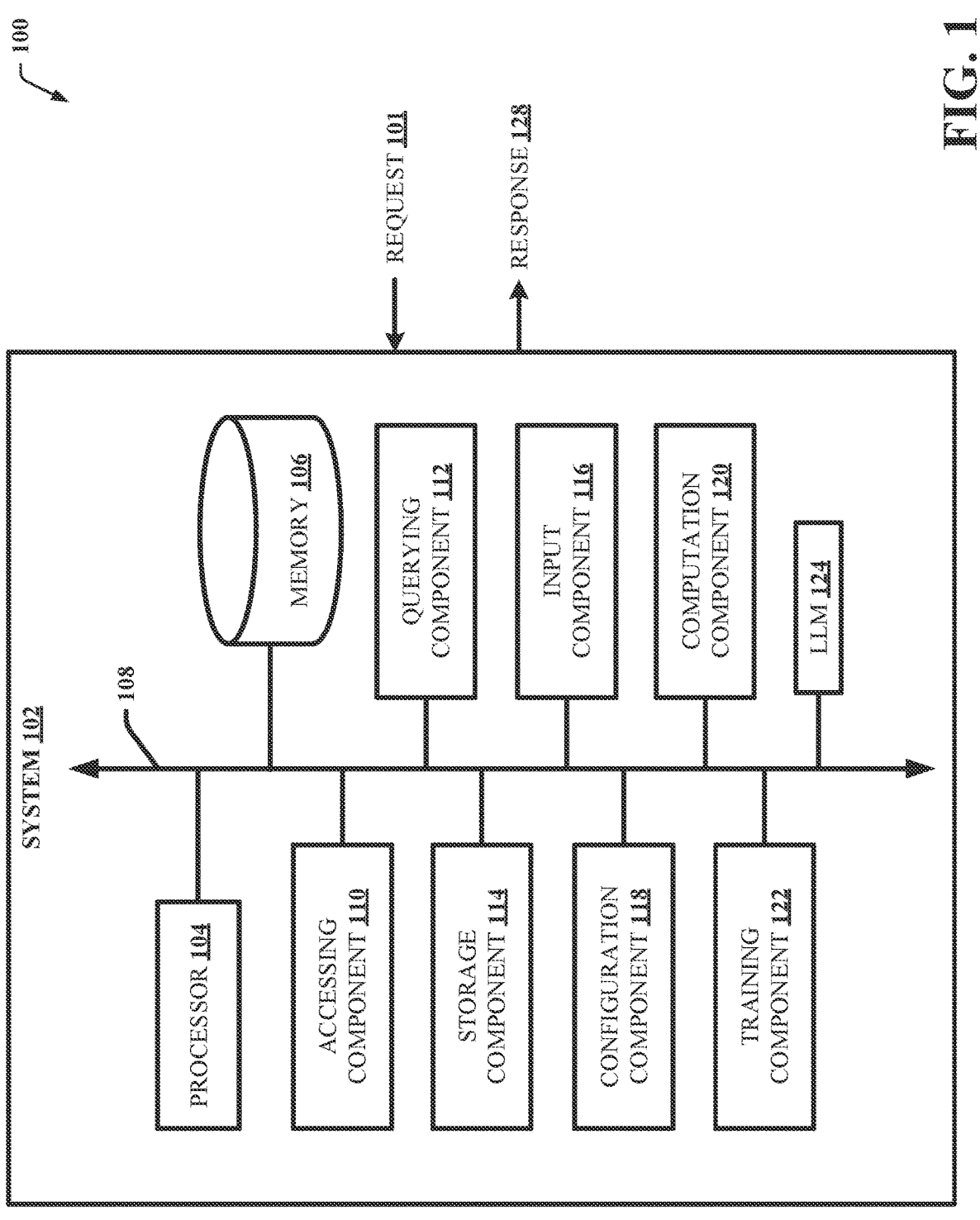
FIG. 1 illustrates a block diagram of an example, non-limiting system that can cache key-value vectors for fixed prefixes in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

According to an embodiment, a system is provided. The system can comprise a memory that can store computer-executable components. The system can further comprise a processor that can execute the computer-executable components stored in the memory, where the computer-executable components can comprise an accessing component that can access a request comprising a fixed prefix and variable data. The computer-executable components can further comprise a storage component that can selectively store in a cache, one or more key-value vectors generated via processing of the fixed prefix by an LLM, based on a temporal moving average of the fixed prefix being greater than a first defined threshold, according to a smart encoding policy. Such embodiments of the system can provide a number of advantages, including reducing the amount of computation that can be performed by the LLM for subsequent requests accessed by the accessing component.

In one or more embodiments of the aforementioned system, a computation component can compute the temporal moving average as an average of a number of times the fixed prefix is accessed by the accessing component over a defined time period and assist with storing the one or more key-value vectors in the cache. In one or more embodiments of the aforementioned system, the computation component can access, in response to the temporal moving average being greater than the first defined threshold, a machine learning model that can process the fixed prefix to predict a first number of tokens generated via processing of the request by the LLM. In one or more embodiments of the aforementioned system, the computation component can compute a ratio of the first number of tokens to a token length of the fixed prefix, and the storage component can store the one or more key-value vectors in the cache if the ratio is greater than a second defined threshold. Such embodiments of the system can provide a number of advantages, including further reducing the amount of computation that can be performed by the LLM, for subsequent requests accessed by the accessing component, by introducing additional machine learning aspects to selectively store the one or more key value vectors.

In one or more embodiments of the aforementioned system, a training component can train the machine learning model to predict the first number of tokens. In one or more embodiments of the aforementioned system, the training component can access pairs of data points collected for a previous request comprising a previous fixed prefix and previous variable data, where each pair of data points of the pairs of data points can include a first data point representing a token length of the previous fixed prefix and a second data point representing a second number of tokens generated via processing of the previous request by the LLM. In one or more embodiments of the aforementioned system, the training component can train the machine learning model with the previous fixed prefix as input and the second number of tokens as an output, and the machine learning model can be a regression model built on a sequence embedding model. Such embodiments of the system can provide a number of advantages, including, further reducing the amount of computation that can be performed by the LLM, for subsequent requests accessed by the accessing component, by training a machine learning model to evaluate the token length of the fixed prefix and the number of tokens generated for the fixed prefix during inferencing.

In one or more embodiments of the aforementioned system, a querying component can query the fixed prefix against the cache to extract the one or more key-value vectors and query the fixed prefix against the LLM to generate the one or more key-value vectors if the one or more key-value vectors are missing from the cache. Such embodiments of the system can provide a number of advantages, including, increasing the inferencing speed of a machine learning model-based architecture employing the LLM.

In one or more embodiments of the aforementioned system, an input component can input the one or more key-value vectors and the variable data into the LLM, where the LLM can generate a response by processing the one or more key-value vectors and the variable data. Such embodiments of the system can provide a number of advantages, including, increasing the inferencing speed of a machine learning model-based architecture employing the LLM.

In one or more embodiments of the aforementioned system, storing the one or more key-value vectors can reduce an amount of computation performed by an LLM-based pipeline employing the cache for subsequent requests comprising the fixed prefix and increase an inferencing speed of the LLM-based pipeline in proportion to a ratio of a token length of the fixed prefix to a token length of an output generated by the LLM-based pipeline.

In one or more embodiments of the aforementioned system, a configuration component can configure the smart encoding policy according to a use case. Such embodiments of the system can provide a number of advantages, including, assisting a machine learning model-based architecture employing the LLM to comprehend meaning and context of data.

In one or more embodiments of the aforementioned system, the storage component can employ positional encoding with the smart encoding policy to store the one or more key-value vectors in the cache. In one or more embodiments of the aforementioned system, an application programming interface (API) can explicitly define a prefix field in the request to input the fixed prefix. Such embodiments of the system can provide a number of advantages, including, further reducing the amount of computation performed by the LLM, for subsequent requests accessed by the accessing component, by separating data comprised in the request into the fixed prefix and the variable data.

An embodiment in which the storage component can selectively store in the cache, the one or more key-value vectors generated via processing of the fixed prefix by the LLM, based on a temporal moving average of the fixed prefix being greater than the first defined threshold and according to a smart encoding policy, and the querying component can query the fixed prefix against the cache to extract the one or more key-value vectors (e.g., for subsequent requests accessed by the accessing component and having the fixed prefix), has the advantage of reducing the amount of computation that can be performed by the LLM for subsequent requests accessed by the accessing component, increasing the inferencing speed of a machine learning model-based architecture employing the LLM and promoting improved and more efficient storage of computational data generating during inferencing.

An exemplary scenario where the aforementioned system can be implemented can include NLP tasks such as text recognition or text generation where the aforementioned system can be an LLM-based service and a prompt can be input as a request to the aforementioned system. The aforementioned system can generate and selectively store key-value vectors for the prefix of the prompt to make the key-value vectors reusable for computations for subsequent prompts comprising the same prefix, input to the aforementioned system by an entity (e.g., hardware, software, artificial intelligence (AI), neural network, machine and/or user).

According to various embodiments, the above-described system can be implemented as a computer-implemented method or as a computer program product.

LLMs are typically deep learning models trained on large datasets comprising billions or trillions of words, for example, as opposed to small language models that are trained on millions of words. LLMs usually also have millions or billions of parameters, whereas small language models have fewer parameters. Thus, LLMs are much larger in terms of data size and model complexity as compared to small language models, and therefore, are also trained for much larger durations than smaller models. LLMs learn and understand large-scale natural language data, thereby greatly improving productivity for individuals. LLMs are becoming popular in machine learning-based production service architectures for various NLP based tasks such as document summarization, text generation or another NLP-based task. Such architectures ingest prompts comprising information that is processed by one or more LLMs to generate responses. To generate responses to prompts, LLMs often employ attention techniques, wherein attentions are computed based on information comprised in the prompts. As part of the attention computations, key-value vectors are generated as numerical representations of the attentions. However, attention computations can be expensive and compute intensive. Currently, ML application libraries explore the possibility of caching of pairs of user requests and final outputs as strings (str) or sentences in natural language. For example, an LLM-based service can summarize documents from a library. Frequently appearing documents and the corresponding outputs generated by the LLM-based service can be cached as pairs of end strings such that results can be directly obtained from the cache for repeated queries. ML applications libraries target entities that want to build services that ingest an input and produce an output. ML serving libraries explore the possibility of temporarily caching vectors (vec) during on-the-fly generation followed by discarding the vectors and generating new vectors for new problems. ML serving libraries do not target specific entities but are available to all entities and are focused on low-level optimizations generated during inferencing such that they can be employed in open source services. Thus, current LLM-based architectures involve extensive computations and have high costs associated with inferencing.

Embodiments of the present disclosure can cache computations based on task descriptions comprised in and repeated across inputs provided to end-to-end services employing LLM-based architectures. Embodiments described herein include systems, computer-implemented methods, and computer program products that can selectively cache key-value vectors for a prefix appearing in prompts that can be ingested by an LLM-based architecture and reutilize the key-value vectors for new prompts ingested by the LLM-based architecture. Embodiments described herein also include techniques to cache the key-value vectors for the prefix to speed up computations for LLM-based architectures that build and utilize prompts having the format [prefix+content], because prompts having the format [prefix+content] can often display a repeated pattern of prefixes. For example, a prompt can include the prefix "You are a helpful assistant for summarization. Please pay attention to your writing and summarize the document. Here is the document:" and also include the document referenced in the prefix. The document can represent variable data that can vary across different prompts having the same prefix, for example, for the same type of task. Such repeating prefixes are referred to as fixed prefixes in various embodiments described herein owing to their fixed nature across prompts. With reference to certain figures, the fixed prefixes are referred to as prompt prefixes.

In various embodiments, an LLM-based architecture can be utilized to cache key-value vectors generated for fixed prefixes appearing in prompts input to the LLM-based architecture, according to a smart encoding policy or caching policy. The cached key-value vectors can be reutilized for prompts comprising fixed prefixes in the format [fixed prefix+variable data/variable content]. In various embodiments, caching the key-value vectors can increase inferencing speeds for the LLM-based architecture by reducing the number of computations that can be performed by one or more LLMs of the LLM-based architecture for processing subsequent prompts. For example, the LLM-based architecture can be accessible to an end entity (e.g., hardware, software, AI, neural network, machine and/or user) as an end-to-end service, and the end entity can enter an entity request into the LLM-based architecture by an end entity. The entity request can comprise prefix content and variable content. The prefix content can include instructions that the LLM-based architecture can execute on the variable content. Upon accessing the entity request, the LLM-based architecture can query the prefix content against a cache to extract key-value vectors previously cached for the prefix content. If the key-value vectors are absent from the cache, for example, if the prefix content is new to the LLM-based architecture, the LLM-based architecture can query the prefix content against an LLM of the LLM-based architecture to generate key-value vectors for the prefix content and store the key-value vectors in the cache. Upon retrieving the key-value vectors from the cache or generating the key-value vectors via execution of the LLM by a processor, an input comprising the variable content and the key-value vectors for the prefix content can be entered into the LLM of the LLM-based architecture to process the input and generate an output that can be returned to the end entity or another end entity.

As described supra, LLMs employ attention techniques to generate responses to prompts. An attention technique is a layer of a neural network in an LLM that allows the LLM to focus on/pay attention to relevant parts of data provided to the LLM, based on different weights assigned to different parts of the data. Key-value vectors or key-value states are numerical representations of the attentions and are generated as part of computing the attentions. For example, upon ingesting a prompt, an LLM can generate embeddings for individual words or tokens in the prompt, and the LLM can transform the embeddings into query vectors, key vectors and value vectors. The key-value vector pairs are used in the attention mechanism to compute attention scores between each word in the prompt and produce contextual representations of words in the prompt. Thus, key-value vectors can be generated for each word in the prompt. Although an LLM can perform a variety of computations, the computation of the attentions can be the single most expensive and memory intensive calculation that can be performed by the LLM. Consequently, LLMs usually involve high costs of running inferences.

In various embodiments, the key-value vectors can be stored in the cache according to a smart encoding policy or caching policy. The smart encoding policy or the caching policy can be an algorithm that can define parameters for storage of the key-value vectors. For example, the smart encoding policy can define that if the N week moving average (i.e., temporal moving average) of a particular prompt prefix appears in prompts more than X times, then the LLM-based architecture can cache key-value vectors for the prompt prefix. Likewise, if the N week moving average of the prompt prefix appears in prompts X times or less than X times, then the LLM-based service can evict or discard the key-value vectors for the prompt prefix. Herein, N and X can be positive integers whose values can be configured in various embodiments. In general, in various embodiments, each parameter of the smart encoding policy can be configured, or the smart encoding policy can be learnt via different techniques, and a machine learning service can be implemented in place to learn the smart encoding policy. In various embodiments, the smart encoding policy can utilize positional encoding to store the key-value vectors for the prompt prefix. Positional encoding refers to the relative location or position of an entity/token/word in a sequence, and positional encoding can be a finite dimensional representation of the location or the position of the entity/token/word.

In various embodiments, key-value vectors generated for prompt prefixes can be initially cached if the temporal moving average for the prompt prefix is greater than a defined threshold ($T_1$). Over time, data points (P, $M_1$) of pairs of tokens can be collected for each prompt prefix ingested by the LLM-based architecture, wherein P is a positive integer that represents the number of tokens in a prompt prefix and $M_1$ is a positive integer that represents the number of tokens generated by the LLM-based architecture while processing the corresponding prompt. Upon collecting K number of data points (P, $M_1$) for different prompt prefixes, wherein K represents a positive integer, a training dataset comprising the K number of data points can be generated and a machine learning model can be trained with the prompt prefixes as inputs and the corresponding $M_1$ tokens as outputs. In various embodiments, once the machine learning model is trained, the machine learning model can be accessed by the LLM-based in response to determining that a new prompt prefix has a temporal moving average greater than the defined threshold, and the machine learning model can process the new prompt prefix to predict a first number of tokens ($M_2$) generated by the LLM-based architecture during processing of a prompt comprising the new prompt prefix. Subsequently, a ratio of $M_2$ to the token length of the new prompt prefix can be generated, and key-value vectors generated for the new prompt prefix can be stored in the cache by the LLM-based architecture if the ratio is greater than a second defined threshold ($T_2$). That is, if $$\frac{M_2}{\text{token length of the new prompt prefix}} > T_2,$$

then key-value vectors for the new prompt prefix can be stored in the cache. In various embodiments, the machine learning model trained to predict the value of $M_2$ can be a regression model built on top of a sentence embedding model.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 1000 illustrated at FIG. 10. For example, non-limiting system 100 can be associated with, such as accessible via, a computing environment 1000 described below with reference to FIG. 10, such that aspects of processing can be distributed between non-limiting system 100 and the computing environment 1000. In one or more described embodiments, computer and/or computing-based elements can be used in connection with implementing one or more of the systems, devices, components and/or computer-implemented operations shown and/or described in connection with FIG. 1 and/or with other figures described herein.

FIG. 1 illustrates a block diagram of an example, non-limiting system 100 that can cache key-value vectors for fixed prefixes in accordance with one or more embodiments described herein.

Non-limiting system 100 and/or the components of non-limiting system 100 can be employed to use hardware and/or software to solve problems that are highly technical in nature (e.g., related to machine learning, neural networks, key-value caching, etc.), that are not abstract and that cannot be performed as a set of mental acts by a human. Further, some of the processes performed may be performed by specialized computers to carry out defined tasks related to the caching of key-value vectors for prefixes of prompts or queries. Non-limiting system 100 and/or components of non-limiting system 100 can be employed to solve new problems that arise through advancements in technologies mentioned above and/or the like. Non-limiting system 100 can provide technical improvements to machine learning systems by increasing inferencing speeds for machine learning models, reducing the inferencing time for machine learning models and providing improved and more efficient storage of computational data generating by machine learning models during inferencing. For example, embodiments disclosed herein can be beneficial for LLM-based pipelines with frequently re-appearing prefixes in prompts or queries (i.e., fixed prefixes). The improvement in inferencing speed for an LLM-based pipeline can increase in proportion to ratio of a token length of a prefix in a prompt input to the LLM-based pipeline to a total-length of an output generated by the LLM-based pipeline based on the prompt. The improvements in inferencing speeds can be very useful for tasks corresponding to long prefixes. For an LLM-based pipeline generating short outputs with minimal variable contents, for example, such as "yes" or "no" responses, the inferencing speed up can be increased by more than 90% of an existing inferencing speed. Non-limiting system 100 can provide additional advantages. For example, non-limiting system 100 can be jointly employed with semantic cache approaches. Further, non-limiting system 100 can be jointly employed with approaches that allow key and value vectors for tokens to be maintained in an interactive generation mode.

Non-limiting system 100 can comprise system 102. Discussion turns briefly to processor 104, memory 106 and bus 108 of system 102. For example, in one or more embodiments, system 102 can comprise processor 104 (e.g., computer processing unit, microprocessor, classical processor, and/or like processor). In one or more embodiments, a component associated with system 102, as described herein with or without reference to the one or more figures of the one or more embodiments, can comprise one or more computer and/or machine readable, writable and/or executable components and/or instructions that can be executed by processor 104 to enable performance of one or more processes defined by such component(s) and/or instruction(s).

In one or more embodiments, system 102 can comprise a computer-readable memory (e.g., memory 106) that can be operably connected to processor 104. Memory 106 can store computer-executable instructions that, upon execution by processor 104, can cause processor 104 and/or one or more other components of system 102 (e.g., accessing component 110, querying component 112, storage component 114, input component 116, configuration component 118, computation component 120, training component 122 and/or LLM 124)

to perform one or more actions. In one or more embodiments, memory 106 can store computer-executable components (e.g., accessing component 110, querying component 112, storage component 114, input component 116, configuration component 118, computation component 120, training component 122, and/or LLM 124).

System 102 and/or a component thereof as described herein, can be communicatively, electrically, operatively, optically and/or otherwise coupled to one another via bus 108. Bus 108 can comprise one or more of a memory bus, memory controller, peripheral bus, external bus, local bus, and/or another type of bus that can employ one or more bus architectures. One or more of these examples of bus 108 can be employed. In one or more embodiments, system 102 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 102 can reside in the cloud, and/or can reside locally in a local computing environment (e.g., at a specified location(s)).

In various embodiments, system 102 can be a machine learning model-based architecture that can allow an end-to-end service to exploit a caching capability of system 102 at the modeling level. For example, system 102 can be a machine learning model-based architecture of an-LLM based service such as a translation service, a grammar correction service, a document summarization service or other NLP-based service that can be accessible to an entity (e.g., hardware, software, AI, neural network, machine and/or user). Stated differently, system 102 can be deployed for translation services that use LLMs, summarization services that uses LLMs and/or grammar correction services that use LLMs. In various embodiments, the entity can input request 101 to system 102, based on which system 102 and/or one or more components of system 102 can generate response 128 comprising a summary of a document(s), a grammar corrected document(s), or another output. In various embodiments, request 101 can comprise a fixed prefix and variable data and accessing component 110 can access request 101 as part of generating response 128. The fixed prefix can define a task for system 102 to execute. For example, the fixed prefix can include sentences such as "You are a helpful assistant for grammar correction. Here is an example." Similarly, the variable data can be the additional data based on which system 102 can execute the task. For example, the variable data can include content needing grammar correction. For example, the variable data can include data such as "Now, given this paragraph, please help me find any grammar issues."

In some embodiments, upon accessing of request 101 by accessing component 110, querying component 112 can query the fixed prefix against a cache to extract one or more key-value vectors previously generated for the fixed prefix by LLM 124. For example, the fixed prefix can be a prefix having appeared in requests previously executed by system 102, wherein such requests can include different variable data, and the one or more key-value vectors generated by LLM 124 for the fixed prefix can exist in the cache to be reused for new requests, such as request 101. After extracting the one or more key-value vectors for the fixed prefix from the cache, input component 116 can input the one or more key-value vectors and the variable data into LLM 124, and LLM 124 can generate response 128 by processing the one or more key-value vectors and the variable data. In some embodiments, the fixed prefix of request 101 can be a new prefix, previously unseen by system 102. In such embodiments, the one or more key-value vectors can be absent/missing from the cache. Upon determining that the one or more key-value vectors are absent from the cache, querying component 112 can query the fixed prefix against LLM 124 (e.g., as part of querying request 101) and LLM 124 can generate the one or more key-value vectors (e.g., as part of generating response 128). As before, the one or more key-value vectors generated by LLM 124 can be stored in the cache by storage component 114 and input into LLM 124 by input component 116 to generate response 128 for subsequent requests having the fixed prefix that can be processed by system 102. In various embodiments, the cache can comprise multiple sets of key-value vectors generated by LLM 124 and respectively corresponding to different fixed prefixes ingested by system 102.

It should be noted that the term "key-value vector(s)" is used as a collective term throughout this specification to indicate key vector(s) and value vector(s) that can be generated by an LLM for a sentence such as a prefix of a prompt or request. Additionally, the terms "key-value vectors" and "key-value states" have been used interchangeably throughout this specification. LLMs use attention techniques to generate responses to queries. An attention technique is a layer of a neural network in an LLM that allows the LLM to focus on/pay attention to relevant parts of data provided to the LLM, based on different weights assigned to different parts of the data. Key-value vectors or key-value states are numerical representations of the attentions and are generated as part of computing the attentions. For example, upon ingesting a prompt, an LLM can generate embeddings for each word or token in the prompt, and the LLM can transform the embeddings into query vectors, key vectors and value vectors. The key-value vector pairs are used in the attention mechanism to compute attention scores between each word in the prompt and produce contextual representations of words in the prompt. Depending on the LLM and the sentence, the values inside the vectors can be different. In this regard, for a model with 6 heads, 12 layers and 64 hidden dimensions (hidden_dim), the key vector for a single sentence with ten tokens can be a [1, 6, 12, 10, 64] vector of 32 bits floating points, and the value vector can have the same size and shape. In general, a single key vector can have the shape [number of sentences, number of attention heads, number of layers, number of tokens, hidden_dim], and the number of 32 bit floating points will be given by number of sentences×number of attention heads×number of layers× number of tokens×hidden dimensions. The corresponding value vector can have the same size and shape.

In various embodiments, storage component 114 can selectively store in the cache, the one or more key-value vectors generated by LLM 124 by processing a fixed prefix, based on a temporal moving average of the fixed prefix being greater than a first defined threshold, $T_1$, according to a smart encoding policy or caching policy. Stated differently, the smart encoding policy or the caching policy can enable selective storage of the one or more key-value vectors based on the temporal moving average of the fixed prefix. For example, in various embodiments, computation component 120 can compute the temporal moving average for the fixed prefix. In various embodiments, in response to the temporal moving average being greater than the first defined threshold, computation component 120 can access a machine learning model that can process the fixed prefix to predict a first number of tokens generated as part of response 128 by LLM 124 by processing request 101. Further, computation component 120 can compute a ratio of the first number of tokens to a token length of the fixed prefix. In various embodiments, storage component 114 can store the one or more key-value vectors in the cache if the ratio is greater than the first defined threshold.

In various embodiments, the machine learning model employed to predict the first number of tokens can be trained by training component 122. For example, training component 122 can access pairs of data points collected for a previous request comprising a previous fixed prefix and previous variable data, wherein each pair of data points of the pairs of data points includes a first data point (P) representing a token length of the previous fixed prefix and a second data point ($M_1$) representing a second number of tokens generated via processing of the previous request by LLM 124. In various embodiments, training component 122 can train the machine learning model with the previous fixed prefix as input and the second number of tokens as an output. In various embodiments, the machine learning model can be a regression model built on a sequence embedding model.

More specifically, for a request comprising a prefix of P tokens and variable data of V tokens, LLM 124 can generate $M_1$ new tokens, where P and V are positive integers that respectively represent the numbers of tokens in/token length of the prefix and the variable data, and $M_1$ is a positive integer that represents the number of tokens generated by LLM 124 by processing the request. At initialization, storage component 114 can cache key-value vectors generated for fixed prefixes having respective temporal moving averages greater than the first defined threshold, $T_1$, for requests received by system 102. It is to be appreciated that the first defined threshold can be a value defined by an entity (e.g., hardware, software, AI, neural network, machine and/or user). As described above, the temporal moving average for a fixed prefix can be an average of the number of times that the fixed prefix is accessed by system 102 (e.g., by accessing component 110) over N days, weeks, or other duration of time, wherein Nis a positive integer that represents a time period over which the fixed prefix is monitored by system 102 (e.g., by computation component 120) to determine if the key-value vectors of the fixed prefix can be cached. Stated differently, the temporal moving average for the fixed prefix can represent an average of N days, weeks, or other duration of time of usage of the fixed prefix. As requests are accessed by accessing component 110, accessing component 110 can collect data points (P, $M_1$) of pairs of tokens for each fixed prefix. Upon collecting K number of data points (P, $M_1$) for a fixed prefix, wherein K represents a positive integer, training component 122 can access the K number of data points (P, $M_1$) to train the machine learning model with the fixed prefix sentences as inputs and the corresponding $M_1$ values as outputs.

Thereafter, system 102 can continue to access (e.g., via accessing component 110) requests such as request 101 and compute temporal averages for the different fixed prefixes (e.g., via computation component 120). As described supra, in response to accessing component 110 accessing a new fixed prefix (e.g., such as the fixed prefix of request 101) having a temporal moving average greater than $T_1$, computation component 120 can access the machine learning model to have the machine learning model process the new fixed prefix and predict the first number of tokens ($M_2$) generated via processing of the corresponding request (e.g., such as request 101) by LLM 124. Computation component 120 can further compute a ratio of the first number of tokens to the token length of the new fixed prefix, and storage component 114 can store key-value vectors generated by LLM 124 for the new fixed prefix in the cache if the ratio is greater than a second defined threshold ($T_2$). That is, if $$\frac{M_2}{\text{token length of the new fixed prefix}} > T_2,$$

the key-value vectors for the new fixed prefix can be stored in the cache. As stated elsewhere herein, the machine learning model can be a regression model built on top of a sentence embedding model.

In various embodiments, storing the one or more key-value vectors corresponding to the fixed prefix of request 101 can reduce the number of computations performed by system 102 to process subsequent requests having the same fixed prefix as that of request 101, thereby reducing an amount of memory consumed by such computations. As described elsewhere herein, LLMs use attention techniques to generate responses to queries. An attention technique is a layer of a neural network in an LLM that allows the LLM to focus on/pay attention to relevant parts of data provided to the LLM, based on different weights assigned to different parts of the data. Key-value vectors or key-value states are numerical representations of the attentions and are generated as part of computing the attentions. For example, upon ingesting a prompt, an LLM can generate embeddings for each word or token in the prompt and the LLM can transform the embeddings into query vectors, key vectors and value vectors. The key-value vector pairs are used in the attention mechanism to compute attention scores between each word in the prompt and produce contextual representations of words in the prompt. Although an LLM can perform a variety of computations, the computation of the attentions can be the single most expensive and memory intensive calculation that an LLM can perform, and such a computation can consume the most amount of graphics processing unit (GPU) space.

Separating keys and values into multiple vectors to generate the key-value vectors can decouple the computation of the attentions from other computations performed by the LLM. In various embodiments, storing such key-value vectors for prefixes frequently accessed by system 102 can significantly reduce the number of computations that system 102 can otherwise end up performing. Storing the one or more key-value vectors also increases the inferencing speed of system 102 to generate response 128. In various embodiments, the inferencing speed can increase in proportion to a ratio of the token length of the fixed prefix to the token length of an output generated by system 102. Selective storage of the one or more key-value vectors, as described supra, can further promote efficient memory consumption inside the cache via storage of frequently appearing fixed prefixes.

In various embodiments, configuration component 118 can configure the smart encoding policy according to a use case. For example, the smart encoding policy can define that if the N week moving average (i.e., temporal moving average) of a particular prefix of a request or prompt appears in entity requests more than X times, then storage component 114 can cache the key-value vectors for the prefix. Likewise, if the N week moving average of the prefix appears in entity requests X times or less than X times, then storage component 114 can evict the key-value vectors for the prefix. Herein, N and X can be positive integers whose values can be configured by configuration component 118.

In general, in various embodiments, each parameter of the smart encoding policy can be configured, or the smart encoding policy can be learnt via different techniques, and a machine learning component can be implemented to learn the smart encoding policy. In various embodiments, storage component 114 can employ positional encoding with the smart encoding policy to store the one or more key-value vectors for the fixed prefix of request 101 in the cache. Positional encoding refers to the relative location or position of an entity/token/word in a sequence, and positional encoding can be a finite dimensional representation of the location or the position of the entity/token/word.

In various embodiments, an API can explicitly define a prefix field in request 101, which prefix field can be utilized to input the fixed prefix to system 102. Doing so can have several benefits. For large models such as LLMs, the hidden state of a prefix (e.g., key-value vectors) can also be very large. That is, large models can generate more key-value vector cache, for example, as opposed to smaller models. In various embodiments, employing the smart encoding policy to selectively store key-value vectors for frequently appearing prefixes can assist to reduce the size of the key-value vector cache, as explained in the preceding discussion. Additionally, defining the fixed prefix and variable data fields via an API call to cache key-value vectors for only the fixed prefix can further assist system 102 to process information more efficiently. For example, LLMs follow a left-to-right (LTR) directionality. That is, an LLM processes requests from the left-hand side to the right-hand side of a sentence to generate tokens. Thus, an LLM can first be provided with the prefix and the LLM can generate key-value vectors for the prefix, after which variable data can be provided to the LLM to process. This can allow the key-value vectors to be processed independently of the variable data. It is to be appreciated that by providing the end portion of a text, the LLM cannot be expected to generate the former portion of the text. Thus, for end-to-end services requiring precision, applicability and reproducibility, words cannot be provided to an LLM in a piecemeal fashion. In this regard, the API can also assist to define an order of input for request 101. It should be noted that for an LLM-based service, the API call can only define the input fields for an entity (e.g., hardware, software, AI, neural network, machine and/or user) to input request 101 into system 102, and the output received by the entity can be the text data generate by system 102 as response 128.

Figure 2:
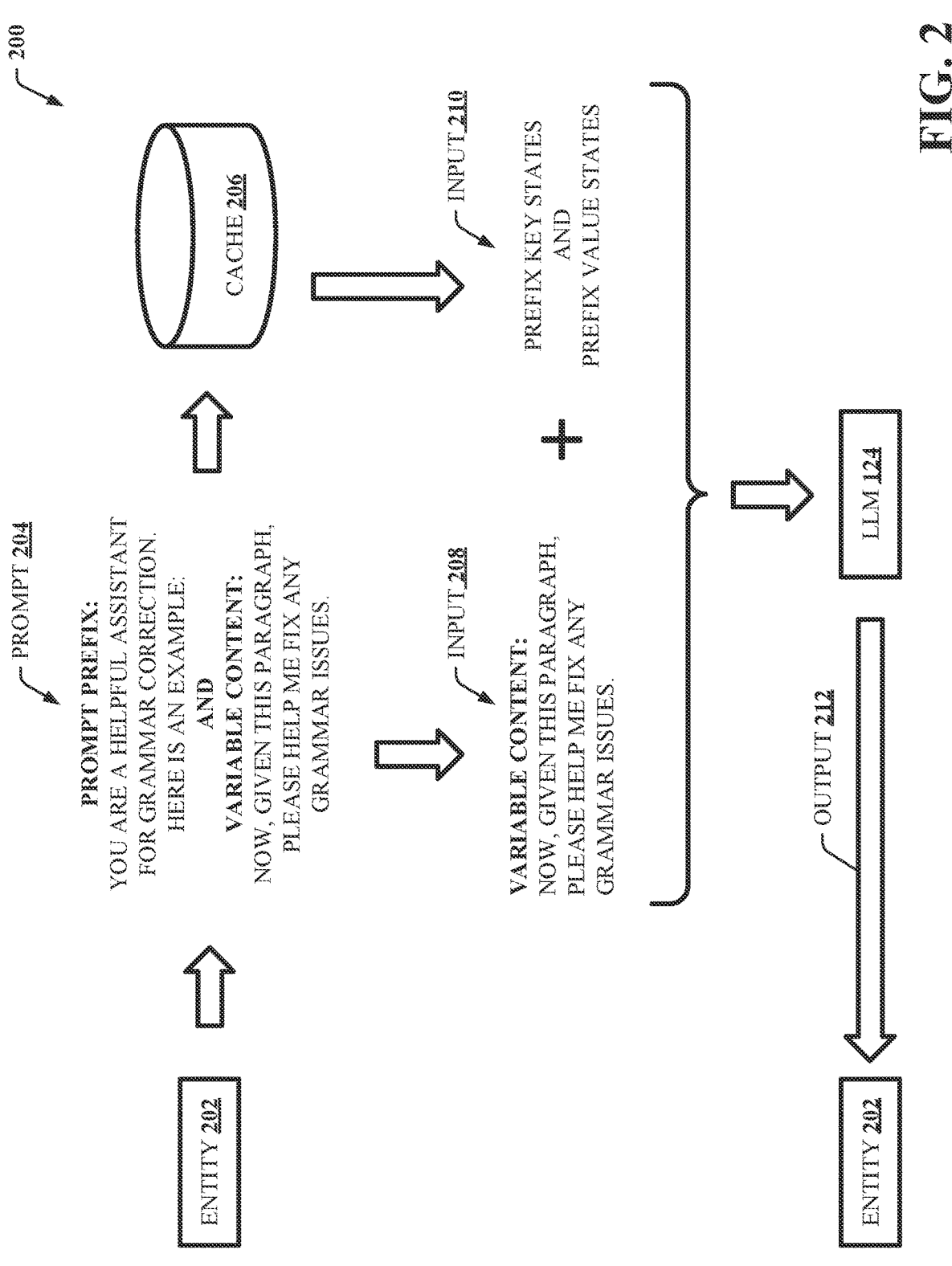
FIG. 2 illustrates a flow diagram of an example, non-limiting process that can cache key-value vectors for prompt prefixes in accordance with one or more embodiments described herein.
Figure 3:
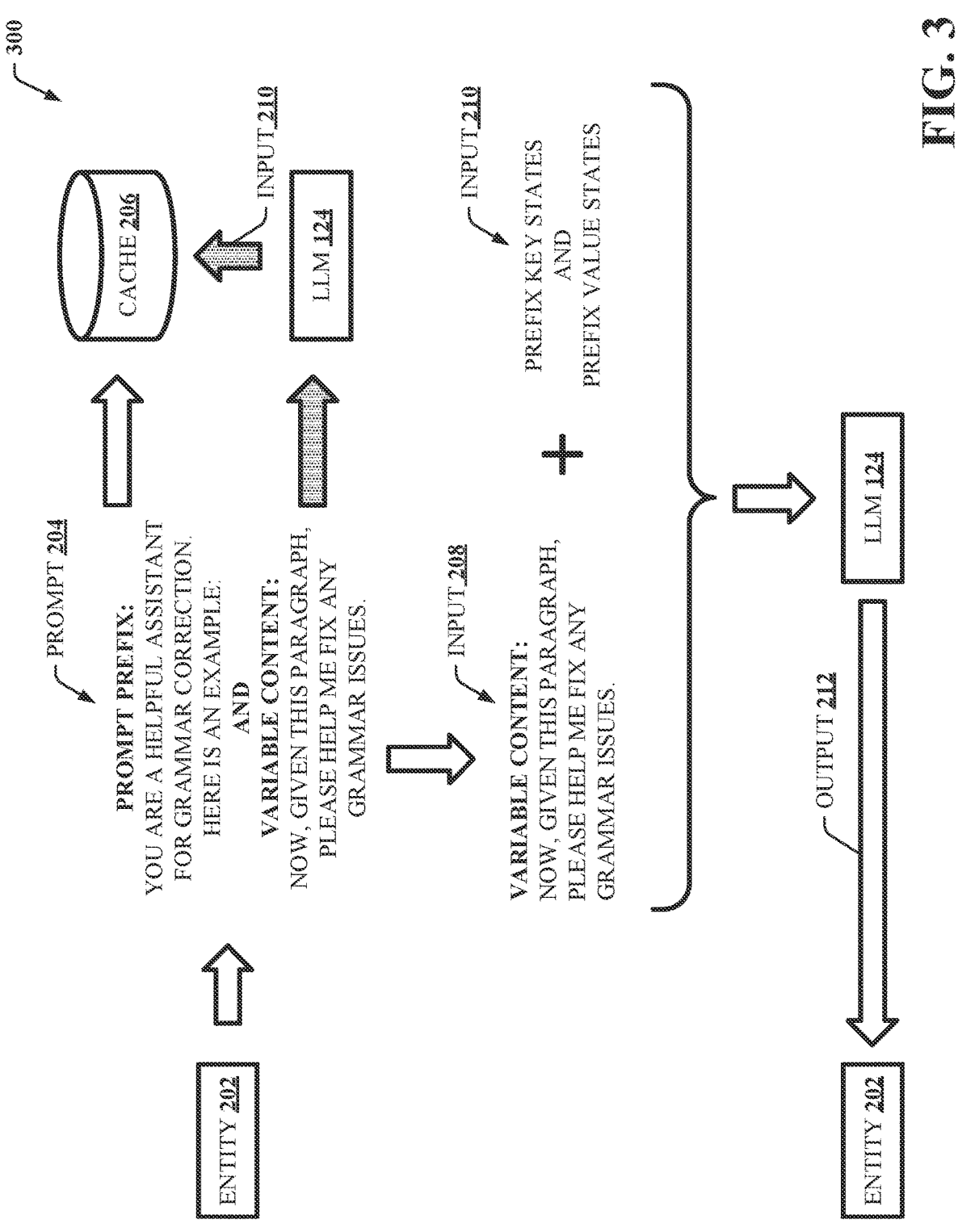
FIG. 3 illustrates another flow diagram of an example, non-limiting processes that can cache key-value vectors for prompt prefixes in accordance with one or more embodiments described herein.

FIGS. 2 and 3 illustrate flow diagrams of respective example, non-limiting processes 200 and 300 that can cache key-value vectors for prompt prefixes in accordance with one or more embodiments described herein. One or more operations described with reference to FIGS. 2 and 3 can be performed by one or more components of FIG. 1. Repetitive description of like elements and/or processes employed in respective embodiments is omitted for sake of brevity.

FIGS. 2 and 3 illustrate additional aspects of the embodiments describe in FIG. 1. In various embodiments, entity 202 can be a hardware, software, AI, neural network, machine and/or user. Entity 202 can enter prompt 204 into a grammar correction service comprising an LLM-based architecture (e.g., system 102). Prompt 204 can comprise a prompt prefix such as "You are a helpful assistant for grammar correction. Here is an example:" and variable content such as "Now, given this paragraph, please help me find any grammar issues." In various embodiments, accessing component 110 can access prompt 204. In various embodiments, querying component 112 can query the prompt prefix of prompt 204 against cache 206 to extract key-value vectors or key-value states previously generated for the prompt prefix by LLM 124. For example, the prompt prefix can be a prefix having appeared in requests previously executed by system 102, which requests can comprise different variable content, and the key-value vectors generated by LLM 124 for the prompt prefix can exist in cache 206 for being reused for a new request, such as prompt 204. After extracting the key-value vectors for the prompt prefix from cache 206, input component 116 can input the key-value vectors as input 210 and the variable content (e.g., a piece of string) as input 208 into LLM 124. In various embodiments, LLM 124 can generate output 212 by processing input 208 and input 210.

In some embodiments, the prompt prefix of prompt 204 can be a new prefix, previously unseen by system 102. In such embodiments, the key-value vectors of input 210 can be absent/missing from cache 206, and querying component 112 can query the prompt prefix against LLM 124 (e.g., as part of prompt 204), as illustrated by the solid arrows in non-limiting process 300, to generate the key-value vectors (e.g., as part of generating output 212). In various embodiments, the key-value vectors generated by LLM 124 can be stored in cache 206 by storage component 114 and input to LLM 124 by input component 116 to generate output 212 for subsequent requests processed by system 102. In various embodiments, cache 206 can comprise multiple sets of key-value vectors generated by LLM 124 and respectively corresponding to different prompt prefixes of different prompts.

In various embodiments, storage component 114 can selectively store in cache 206, the key-value vectors generated by LLM 124 by processing the prompt prefix, based on a temporal moving average of the prompt prefix being greater than a first defined threshold, according to a smart encoding policy or caching policy. Stated differently, the smart encoding policy or the caching policy can enable selective storage of the key-value vectors based on the temporal moving average of the prompt prefix. For example, in various embodiments, computation component 120 can compute the temporal moving average for the prompt prefix. In various embodiments, in response to the temporal moving average being greater than the first defined threshold, computation component 120 can access a machine learning model that can process the prompt prefix to predict a first number of tokens generated as part of output 212 by LLM 124 by processing prompt 204. Further, computation component 120 can compute a ratio of the first number of tokens to a token length of the prompt prefix. In various embodiments, storage component 114 can store the key-value vectors in cache 206 if the ratio is greater than the first defined threshold.

In various embodiments, the machine learning model employed to predict the first number of tokens can be trained by training component 122. For example, training component 122 can access pairs of data points collected for a previous prompt comprising a previous prompt prefix and previous variable content, wherein each pair of data points of the pairs of data points includes a first data point (P) representing a token length of the previous prompt prefix and a second data point ($M_1$) representing a second number of tokens generated via processing of the previous prompt by LLM 124. In various embodiments, training component 122 can train the machine learning model with the previous prompt prefix as input and the second number of tokens as an output. In various embodiments, the machine learning model can be a regression model built on a sequence embedding model.

More specifically, a prompt can comprise a prefix of P tokens and variable content of V tokens, and LLM 124 can generate $M_1$ new tokens for the prefix, where P and V are positive integers that respectively represent the numbers of tokens in/token length of the prompt prefix and the variable content, and $M_1$ is a positive integer that represents the number of tokens generated by LLM 124 by processing the prompt. At initialization, storage component 114 can cache key-value vectors generated for prompt prefixes having respective temporal moving averages greater than the first defined threshold $(T_1)$, for prompts received by system 102. As more prompts are accessed by accessing component 110, accessing component 110 can collect data points $(P, M_1)$ of pairs of tokens for each prompt prefix. Upon collecting K number of data points $(P, M_1)$ for different prompt prefixes, wherein K represents a positive integer, training component 122 can access the K number of data points $(P, M_1)$ to generate a training dataset. Training component 122 can employ the training dataset to train the machine learning model with the prompt prefixes as inputs and the corresponding $M_1$ tokens as outputs.

It is to be appreciated that the first defined threshold can be a value defined by an entity (e.g., hardware, software, AI, neural network, machine and/or user). As described above, the temporal moving average for a prompt prefix can be an average of the number of times that the prompt prefix is accessed by system 102 (e.g., by accessing component 110) over N days, weeks, or other duration of time, wherein N is a positive integer that represents a time period over which the prompt prefix is monitored by system 102 (e.g., by computation component 120) to determine if the key-value vectors of the prompt prefix can be cached. Stated differently, the temporal moving average for the prompt prefix can represent an average of N days, weeks, or other duration of time of usage of the prompt prefix.

System 102 can continue to access (e.g., via accessing component 110) prompts such as prompt 204 and compute temporal averages for the different prompt prefixes (e.g., via computation component 120). Once the machine learning model is trained, computation component 120 can access the machine learning model to have the machine learning model process a new prompt prefix and predict the first number of tokens $(M_2)$ generated via processing of the corresponding request (e.g., such as prompt 204) by LLM 124, in response to accessing component 110 accessing the new prompt prefix (e.g., such as the prompt prefix of prompt 204) having a temporal moving average greater than $T_1$. Computation component 120 can further compute a ratio of the first number of tokens generated to the token length of the new prompt prefix and storage component 114 can store key-value vectors generated by LLM 124 for the new prompt prefix in the cache if the ratio is greater than a second defined threshold $(T_2)$. That is, if $$\frac{M_2}{\text{token length of the new prompt prefix}} > T_2,$$

the key-value vectors for the new prompt prefix can be stored in cache 206. As stated elsewhere herein, the machine learning model can be a regression model built on top of a sentence embedding model.

In various embodiments, when a prompt prefix is accessed by accessing component 110 the first time, storage component 114 does not cache the key-value vectors for the prompt prefix. Instead, in various embodiments, computation component 120 can generate a statistic. For example, for an exemplary prompt prefix, computation component 120 can generate a statistic indicating that the prompt prefix has appeared once during any particular day. The following day, the same prompt prefix can be input to system 102 as part of three different prompts, each having different variable content, and computation component 120 can record that the prompt prefix has appeared three times. Only when the prompt prefix appears a threshold number of times, for example, as defined by an entity (e.g., hardware, software, AI, neural network, machine and/or user) employing system 102, computation component 120 can compute a temporal moving average for the prompt prefix to determine whether the key-value vectors for the prompt prefix can be cached. As stated elsewhere herein, the time period over which the temporal moving average can also be collected, can be entity defined. Storage component 114 can store the key-value vectors for the prompt prefix in cache 206 if the temporal moving average is greater than the first defined threshold, and the key-value vectors can be reused according to the smart encoding policy or caching policy.

In an embodiment, the usage of the prompt prefix can decline over a subsequent week, for example, if the grammar correction service is updated and a better prompt becomes available. As a result, the temporal moving average for the prompt prefix can also decline, and storage component 114 can discard the key-value vectors for prompt 204 if the value of the temporal moving average drops below a threshold (e.g., a first defined threshold). As such, computation component 120 can provide a statistical component to the various embodiments herein to continue to track of the temporal average for any given prompt prefix. In various embodiments, the prompt prefix appearing several times can be indicative that the prompt prefix has significant business value to make the prompt reusable. Thus, selectively computing the temporal moving average for the prompt prefix, for example, based on the number of times that the prompt prefix appears in prompts, can have provide financial benefits for providers of LLM-based services because computation can be more expensive that storage.

As stated elsewhere herein, storing the key-value vectors corresponding to the prompt prefix of prompt 204 can also reduce the number of computations performed by system 102 to process subsequent requests having the same prompt prefix as that of prompt 204, thereby reducing an amount of memory consumed by such computations. Further, selective storage of the key-value vectors, as described in one or more embodiments, can further promote efficient memory consumption of cache 206 by avoiding storage of infrequently appearing prompt prefixes. Storing the key-value vectors can also increase the inferencing speed of system 102 to generate output 212. In various embodiments, the inferencing speed can increase in proportion to a ratio of the token length of the prompt prefix to the token length of an output generated by system 102. For short outputs with minimal variable contents, for example, such as "yes" or "no" responses, the inferencing speed up can increase by more than 90% of an existing inferencing speed.

In various embodiments, an API can explicitly define a prefix field in prompt 204, which prefix field can be utilized to input the prompt prefix. In conjunction with the smart encoding policy, the API can provide a further advantage by assisting with selectively caching key-value vectors for prompt prefixes, because computations can be expensive and storing key-value vectors in cache 206 can generate a significant amount of data. For example, for large models such as LLMs, the hidden state of a prefix (e.g., key-value vectors) can also be very large. That is, larger models can generate more key-value vector cache, for example, as opposed to smaller models. As previously noted, employing the smart encoding policy to selectively store key-value vectors for frequently appearing prefixes can reduce the size of cache 206. Additionally, defining the prompt prefix and variable data fields via an API call can further assist system 102 to process information more efficiently by caching key-value vectors for only the prompt prefix. For example, LLMs follow an LTR directionality. That is, an LLM processes requests from the left-hand side to the right-hand side of a sentence to generate tokens. Thus, an LLM can be provided with the prefix at the beginning of a text and the LLM can generate key-value vectors, after which variable data can be provided to the LLM to process.

In various embodiments, an entity (e.g., hardware, software, AI, neural network, machine and/or user) can design an API call to allow an end entity (e.g., hardware, software, AI, neural network, machine and/or user) to explicitly define a problem, such as prompt 204, in terms of the prompt prefix and the variable content. Since prefixes can be fixed for the same types of tasks, the API call can reduce the number of computations performed by the grammar correction service. For example, the prefix "You are a helpful assistant for grammar correction. Here is an example:" can be the same for specific grammar correction tasks and only the variable content can change. Thus, upon prompt 204 or another prompt with the same prompt prefix as that of prompt 204 being accessed by accessing component 110, querying component 112 can query cache 206 to extract key-value vectors previously generated by LLM 124 for the prompt prefix. Doing so can reduce the amount of time spent by LLM 124 to generate the key-value vectors for the prompt prefix if the key-value vectors already exist in cache 206, even though output 212 and the processing executed by LLM 124 to generate output 212 can remain the same. Additional aspects of the API call are described in greater detail with reference to FIG. 4.

Computational advantages provided by the various embodiments herein are further explained via the following description. Given a prefix (i.e., prompt prefix) with T tokens and a suffix (i.e., variable content) with N tokens, the attention computation for the attention $QK^T$ without prefix caching (i.e., without caching of key-value vectors for the prefix) can be given by Equation 1. Additionally, the corresponding softmax value, $(QK^T)*V$, without prefix caching, can be given by Equation 2. In both Equation 1 and Equation 2, there are about $2 \times (\text{Batch}^2 * (\text{T+N})^2 * \text{NUM}_{Head}^2 * \text{Hidden}_{size})$ flops.

$$(\text{Batch}, T + N, \text{Hidden\_size}, \text{Num\_head})* \qquad \text{Equation 1}$$
$$(\text{Batch}, \text{Hidden\_size}, T + N, \text{Num\_head}) =$$
$$(\text{Batch}, T + N, T + N, \text{Num\_Head})$$

$$(\text{Batch}, T + N, T + N, \text{Num\_head})* \qquad \text{Equation 2}$$
$$(\text{Batch}, T + N, \text{hidden\_size}, \text{Num\_head}) =$$
$$(\text{Batch}, T + N, \text{Hidden\_size}, \text{Num\_Head})$$

On the contrary, after employing prefix caching for T tokens, as described by the embodiments of the present disclosure, K=(Batch, Hidden_size, T, Num_head) and V=(Batch, Hidden_size, T, Num_head). Thus, the attention computation for the attention $QK^T$ can be given by Equation 3, and the softmax value, $(QK^T)*V$, can be given by Equation. In both Equation 3 and Equation 4, there are about $2*(\text{Batch}^2 * (\text{T+N})*\text{N}*\text{NUM}_{Head}^2 * \text{Hidden}_{size})$ flops.

$$(\text{Batch}, N, \text{Hidden\_size}, \text{Num\_head})* \qquad \text{Equation 3}$$
$$(\text{Batch}, \text{Hidden\_size}, T + N, \text{Num\_head}) =$$
$$(\text{Batch}, N, T + N, \text{Num\_Head})$$

$$(\text{Batch}, N, T + N, \text{Num\_head})* \qquad \text{Equation 4}$$
$$(\text{Batch}, T + N, \text{Hidden\_size}, \text{Num\_head}) =$$
$$(\text{Batch}, N, \text{Hidden\_size}, \text{Num\_Head})$$

It should be noted that the tensor involved in the multiplication can be reduced by the size of (Batch, T, T+N, Num_Head) by employing prefix caching. Further, the flops saved with the techniques disclosed by the various embodiments herein can be reduced by $4*\text{Batch}^2 * (\text{T+N}) *\text{T}*\text{NUM}_{Head}^2 * \text{Hidden}_{size}$ flops. In the Equations presented above, batch represents the number of sentences, hidden-size (hidden_size) represents a pre-defined vector size, Num_head represents the number of heads, Q represents the query vector, K represents the key vector and V represents the value vector in the attention mechanism.

In various embodiments, configuration component 118 can configure the smart encoding policy according to a use case. For example, the smart encoding policy can define that if the N week moving average (i.e., temporal moving average) of a particular prompt prefix appears in prompts/entity requests more than X times, then storage component 114 can cache the key-value vectors for the prompt prefix. Likewise, if the N week moving average of the prompt prefix appears in prompts/entity requests X times or less than X times, then storage component 114 can discard the key-value vectors for the prompt prefix. Herein, N and X can be positive integers whose values can be configured by configuration component 118. In general, in various embodiments, each parameter of the smart encoding policy can be configured, or the smart encoding policy can be learnt via different techniques, and a machine learning component can be implemented to learn the smart encoding policy. In various embodiments, storage component 114 can employ positional encoding with the smart encoding policy to store the key-value vectors for the prompt prefix of prompt 204 in cache 206. Positional encoding refers to the relative location or position of an entity/token/word in a sequence, and positional encoding can be a finite dimensional representation of the location or the position of the entity/token/word.

Figure 4:
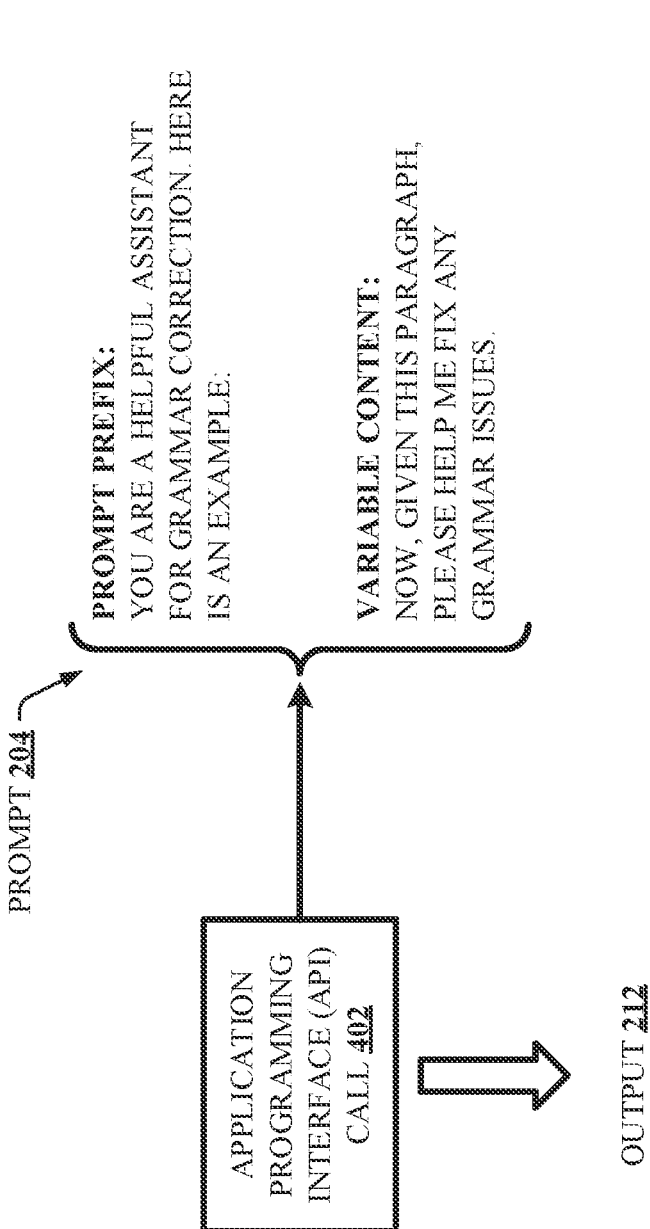
FIG. 4 illustrates a flow diagram of an example, non-limiting representation of a fixed prefix field and a variable data field defined for a prompt via an API call in accordance with one or more embodiments described herein.

FIG. 4 illustrates a flow diagram of an example, non-limiting representation 400 of a fixed prefix field and a variable data field defined for a prompt via an API call in accordance with one or more embodiments described herein. One or more operations described with reference to FIG. 4 can be performed by one or more components of FIG. 1. Repetitive description of like elements and/or processes employed in respective embodiments is omitted for sake of brevity.

With continued reference to FIGS. 2 and 3, API call 402 can explicitly define the prefix field in prompt 204 to input the prompt prefix. In conjunction with the smart encoding policy, API call 402 can provide a further advantage by assisting with selectively caching key-value vectors for prompt prefixes, because computations can expensive and storing key-value vectors in cache 206 can generate a significant amount of data. For example, for large models such as LLMs, the hidden state of a prefix can also be very large. That is, larger models can generate more key-value vector cache, for example, as opposed to smaller models. As stated elsewhere herein, employing the smart encoding policy to selectively store key-value vectors for frequently appearing prefixes can reduce the size of cache 206. Additionally, defining the prompt prefix and variable data fields via API call 402 to cache key-value vectors for only the prompt prefix can further assist system 102 to process information more efficiently. For example, LLMs follow an LTR directionality. That is, LLMs process requests from the left-hand side to the right-hand side of a sentence to generate tokens. Thus, an LLM can be provided with a prefix at the beginning of a text and the LLM can generate key-value vectors, after which variable data can be provided to the LLM to process.

In various embodiments, an entity (e.g., hardware, software, AI, neural network, machine and/or user) can design API call 402 to allow an end entity (e.g., hardware, software, AI, neural network, machine and/or user) to explicitly define a problem, such as prompt 204, in terms of the prompt prefix and the variable content. Since prefixes can be fixed for the same types of tasks, API call 402 can reduce the number of computations performed by an LLM-based architecture employed by a service such as, for example, a grammar correction service, a summarization service, and/or other text recognition or text generation tasks. For example, the prefix "You are a helpful assistant for grammar correction. Here is an example:" can be the same for specific grammar correction tasks and only the data needing the grammar correction can change.

In some embodiments, API call 402 can be provided to end entities (e.g., hardware, software, AI, neural network, machine and/or user) via an interface. For example, a company, organization or service provider can provide API call 402 and an entity (e.g., hardware, software, AI, neural network, machine and/or user) can access API call 402 to input prompts or queries that can be processed by system 102. For example, when employing API call 402 to generate response to various queries, an entity (e.g., hardware, software, AI, neural network, machine and/or user) employed by a grammar correction service can see two fields, for example, a prefix field and a variable data field, where the entity can define the information that system 102 can be expected to process.

In other embodiments, the entity (e.g., hardware, software, AI, neural network, machine and/or user) can provide a service to an end entity, wherein the end entity can provide a query or prompt to the entity to solve NLP-based problems or generating responses to NLP-based tasks, and the entity can access system 102 to generate a response to the query or the prompt provided by the end entity. In such embodiments, API call 402 can be encapsulated behind an end-to-end service offered by the entity to the end entity, and the end entity can provide the query or the prompt to the end-to-end service via a graphical user interface (GUI) at a device (e.g., a cell phone, desktop computer, laptop, tablet, etc.) without needing to divide data contained in the prompt into a prefix field and a variable data field. Thereafter, the entity offering the end-to-end service can access API call 402 on behalf of the end entity. In general, API call 402 can be an API protocol that can define two inputs, for example, a fixed prefix field and a variable data field, and the information output by API call 402 to the end entity can be text data such as output 212. API call 402 can be defined in any programming language.

Figure 5:
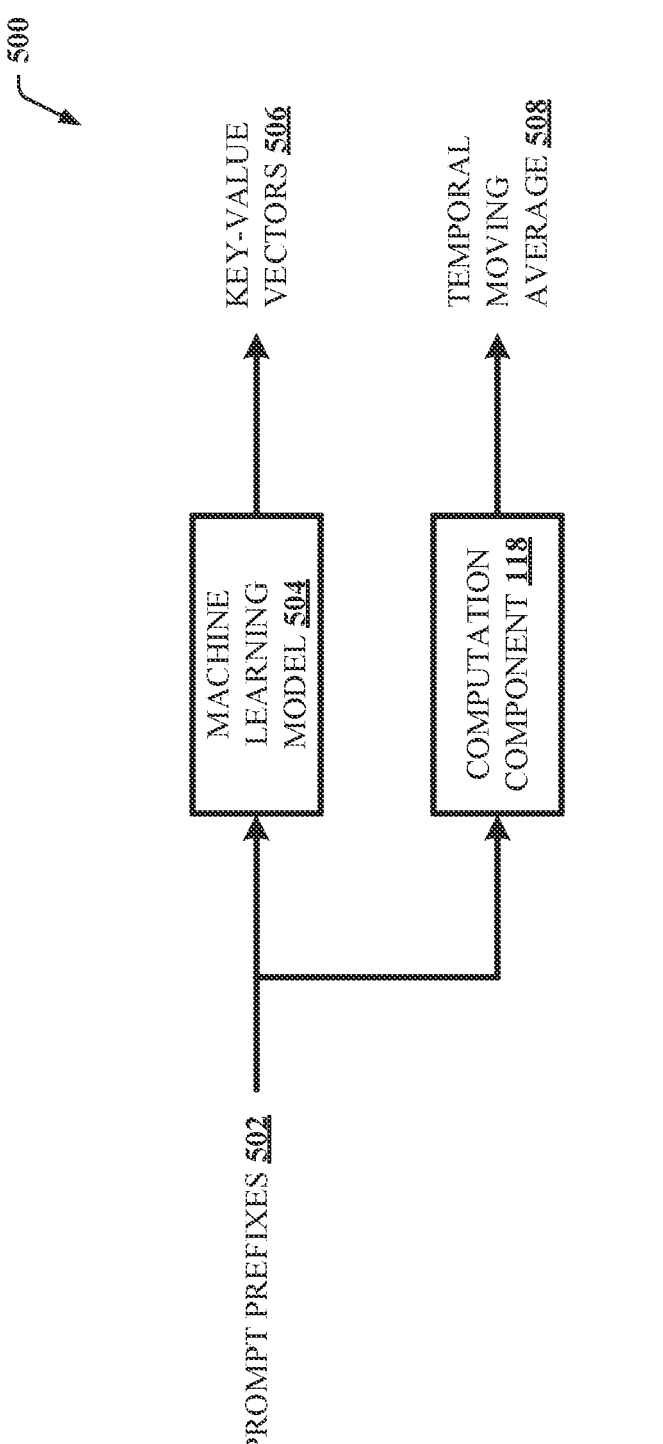
FIG. 5 illustrates a flow diagram of an example, non-limiting process that can generate key-value vectors and a temporal moving average for a prompt prefix in accordance with one or more embodiments described herein.

FIG. 5 illustrates a flow diagram of an example, non-limiting process 500 that can generate key-value vectors and a temporal moving average for a prompt prefix in accordance with one or more embodiments described herein. One or more operations described with reference to FIG. 5 can be performed by one or more components of FIG. 1. Repetitive description of like elements and/or processes employed in respective embodiments is omitted for sake of brevity.

In various embodiments, an end-to-end service can employ a machine learning model-based architecture (e.g., system 102) having a caching capability based on a smart encoding policy or caching policy to cache key-value vectors for frequently appearing prefixes (i.e., fixed prefixes or prompt prefixes) in prompts or queries to solve NLP-based tasks or problems. For example, prompt prefixes 502 can comprise one or more different prompt prefixes (e.g., "You are a helpful assistant for document summarization," "You are a helpful assistant for spelling and grammar correction," etc.) that can be input to the end-to-end service by an entity (e.g., hardware, software, AI, neural network, machine and/or user) as part of a prompt. Machine learning model 504 can generate key-value vectors 506 for respective prompt prefixes of prompt prefixes 502. Key-value vectors 506 generated for a prompt prefix can be employed by machine learning model 504 to further generate a response to the corresponding prompt comprising the prompt prefix and additional data. In an embodiment, machine learning model 504 can be an LLM analogous to LLM 124.

In various embodiments, a prompt prefix of prompt prefixes 502 can first be accessed by accessing component 110 as part of a query ingested by the machine learning model-based architecture. Thereafter, key-value vectors 506 can be generated by machine learning model 504 for the prompt prefix. Alongside the generation of key-value vectors 506, a statistic can be generated by computation component 120 to assist storage component 114 to determine whether or not to cache key-value vectors 506 generated by machine learning model 504 for the prompt prefix. For example, computation component 120 can count the number of times the prompt prefix gets accessed by accessing component 110 over a specified time period. For example, the prompt prefix can appear in only one prompt input to the end-to-end service on a particular day, and computation component 120 can generate a statistic indicating that the prompt prefix has appeared once during any particular day. The following day, the prompt prefix can appear in three different prompts, and computation component 120 can generate a statistic indicating that the prompt prefix has appeared three times during that day. When the prompt prefix appears a specific number of times, for example, as defined by the entity employing the end-to-end service, computation component 120 can compute temporal moving average 508 for the prompt prefix to determine whether key-value vectors 506 for the prompt prefix can be cached. Temporal moving average 508 can be an average of the number of times that the prompt prefix is accessed by accessing component 110 over N days, weeks, or other duration of time, wherein N is a positive integer that represents a time period over which the prompt prefix is monitored by computation component 120.

In various embodiments, if temporal moving average 508 is greater than a defined threshold ($T_1$), storage component 114 can store key-value vectors 506 for the prompt prefix in a cache. Otherwise, storage component 114 can discard key-value vectors 506, according to a smart encoding policy or caching policy, as further detailed with reference to FIG. 6. Key-value vectors 506 stored in the cache can be reused. Over time, the appearance of the prompt prefix in prompts accessed by accessing component 110 can decline. For example, the machine learning model-based architecture can be updated, and a better prompt prefix can become available. As a result, the value of temporal moving average 508 computed by computation component 120 for the prompt prefix can also fall below the defined threshold, and storage component 114 can discard key-value vectors 506 generated for the prompt prefix. Thus, computation component 120 can provide a statistical component to the various embodiments herein to continuously track temporal moving average 508 for respective prompt prefixes of prompt prefixes 502.

Figure 6:
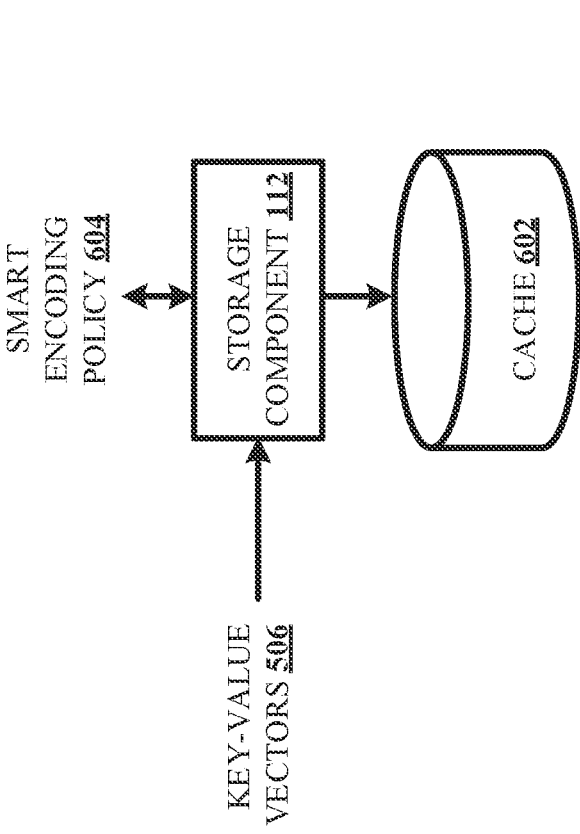
FIG. 6 illustrates a flow diagram of an example, non-limiting process that can store key-value vectors generated for a prompt prefix in a cache in accordance with one or more embodiments described herein.

FIG. 6 illustrates a flow diagram of an example, non-limiting process 600 that can store key-value vectors generated for a prompt prefix in a cache in accordance with one or more embodiments described herein. One or more operations described with reference to FIG. 6 can be performed by one or more components of FIG. 1. Repetitive description of like elements and/or processes employed in respective embodiments is omitted for sake of brevity.

With continued reference to FIG. 5, storage component 114 can store key-value vectors 506 in cache 602 based on temporal moving average 508, according to smart encoding policy 604. As stated supra, temporal moving average 508 can be an average of the number of times that the prompt prefix is accessed by accessing component 110 over N days, weeks, or other duration of time, wherein Nis a positive integer that represents a time period over which the prompt prefix is monitored by computation component 120. In various embodiments, smart encoding policy 604 can define that storage component 114 can store key-value vectors 506 in cache 602 if the value for temporal moving average 508 is greater than the defined threshold. Smart encoding policy 604 can further define that storage component 114 can discard key-value vectors 506 if the value for temporal moving average 508 is less than the defined threshold. In this regard, smart encoding policy 604 can specify the threshold value for temporal moving average 508 and the corresponding N value. In various embodiments, smart encoding policy 604 can define different temporal moving average values and the corresponding N values for different prompt prefixes.

Initially, storage component 114 can cache key-value vectors 506 generated for a prompt prefix if temporal moving average 508 is greater than the defined threshold. Over time, accessing component 110 can collect data points (P, $M_1$) of pairs of tokens for each prompt prefix of prompt prefixes 502 accessed by accessing component 110, wherein P is a positive integer that represents the number of tokens in a prompt prefix and $M_1$ is a positive integer that represents the number of tokens generated by the machine learning model-based architecture while processing the prompt. Upon collecting K number of data points (P, $M_1$) for different prompt prefixes, wherein K represents a positive integer, training component 122 can access the K number of data points (P, $M_1$) to train a machine learning model (not illustrated) with the prompt prefixes as inputs and the corresponding $M_1$ tokens as outputs. Once the machine learning model is trained, computation component 120 can access the machine learning model in response to determining that a new prompt prefix has temporal moving average 508 greater than the defined threshold, and the machine learning model can process the new prompt prefix to predict a first number of tokens ($M_2$) generated by the machine learning model-based architecture during processing of a prompt comprising the new prompt prefix. Computation component 120 can further compute a ratio of $M_2$ to the token length of the new prompt prefix, and storage component 114 can store key-value vectors 506 generated by machine learning model 504 for the new prompt prefix in cache 602 if the ratio is greater than a second defined threshold ($T_2$). That is, if $$\frac{M_2}{\text{token length of the new prompt prefix}} > T_2,$$

key-value vectors 506 for the new prompt prefix can be stored in cache 602. As stated elsewhere herein, the machine learning model trained to predict the value of $M_2$ can be a regression model built on top of a sentence embedding model.

Figure 7:
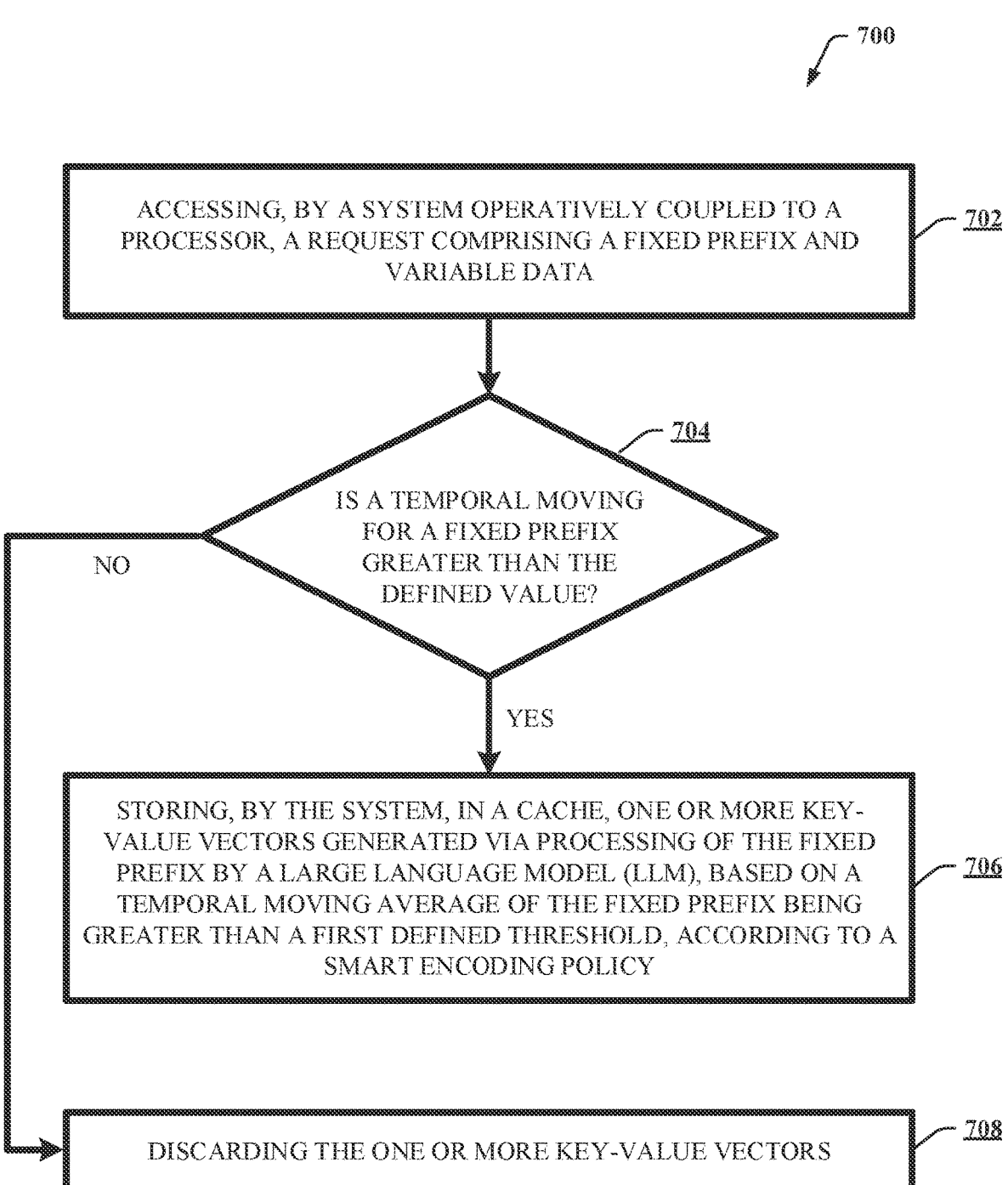
FIG. 7 illustrates a flow diagram of an example, non-limiting method that can cache key-value vectors for prompt prefixes in accordance with one or more embodiments described herein.

FIG. 7 illustrates a flow diagram of an example, non-limiting method 700 that can cache key-value vectors for prompt prefixes in accordance with one or more embodiments described herein. One or more operations described with reference to FIG. 7 can be performed by one or more components of FIG. 1. Repetitive description of like elements and/or processes employed in respective embodiments is omitted for sake of brevity.

At 702, the non-limiting method 700 can comprise accessing (e.g., by accessing component 110), by a system operatively coupled to a processor, a request comprising a fixed prefix and variable data.

At 704, the non-limiting method 700 can comprise determining (e.g., by computation component 120) whether a temporal moving average for a fixed prefix is greater than a defined value.

If yes, at 706, the non-limiting method 700 can comprise storing (e.g., by storage component 114), by the system, in a cache, one or more key-value vectors generated via processing of the fixed prefix by an LLM, based on the temporal moving average of the fixed prefix being greater than a first defined threshold, according to a smart encoding policy.

If not, at 708, the non-limiting method 700 can comprise discarding (e.g., by storage component 114) the one or more key value vectors generated for the fixed prefix.

FIG. 8 illustrates a flow diagram of an example, non-limiting method 800 that can determine whether one or more key-value vectors for a fixed prefix can be stored in a cache in accordance with one or more embodiments described herein. One or more operations described with reference to FIG. 8 can be performed by one or more components of FIG. 1. Repetitive description of like elements and/or processes employed in respective embodiments is omitted for sake of brevity.

With continued reference to non-limiting method 700, non-limiting method 800 describes additional aspects of storing the one or more key value vectors in the cache.

At 802, the non-limiting method 800 can comprise computing (e.g., by computation component 120), by the system, the temporal moving average for the fixed prefix as an average of a number of times the fixed prefix is accessed by the system over a defined time period.

At 804, the non-limiting method 800 can comprise accessing (e.g., by computation component 120), by the system, in response to the temporal moving average being greater than the first defined threshold, a machine learning model that processes the fixed prefix to predict a first number of tokens generated via processing of the request by the LLM.

At 806, the non-limiting method 800 can comprise computing (e.g., by computation component 120), by the system, a ratio of the first number of tokens to a token length of the fixed prefix, wherein the one or more key-value vectors are stored in the cache if the ratio is greater than a second defined threshold.

FIG. 9 illustrates a flow diagram of an example, non-limiting method 900 that can train a machine learning model to predict a number of tokens generated by an LLM by processing a request comprising a fixed prefix and variable data in accordance with one or more embodiments described herein. One or more operations described with reference to FIG. 9 can be performed by one or more components of FIG. 1. Repetitive description of like elements and/or processes employed in respective embodiments is omitted for sake of brevity.

With continued reference to non-limiting method 800, non-limiting method 900 describes additional aspects of training the machine learning model to predict the first number of tokens generated via processing of the request by the LLM.

At 902, the non-limiting method 900 can comprise accessing (e.g., by training component 122), by the system, pairs of data points collected for a previous request comprising a previous fixed prefix and previous variable data, wherein each pair of data points of the pairs of data points includes a first data point representing a token length of the previous fixed prefix and a second data point representing a second number of tokens generated via processing of the previous request by the LLM.

At 904, the non-limiting method 900 can comprise training (e.g., by training component 122), by the system, the machine learning model with the previous fixed prefix as input and the second number of tokens as an output, wherein the machine learning model is a regression model built on a sequence embedding model.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

Figure 10:
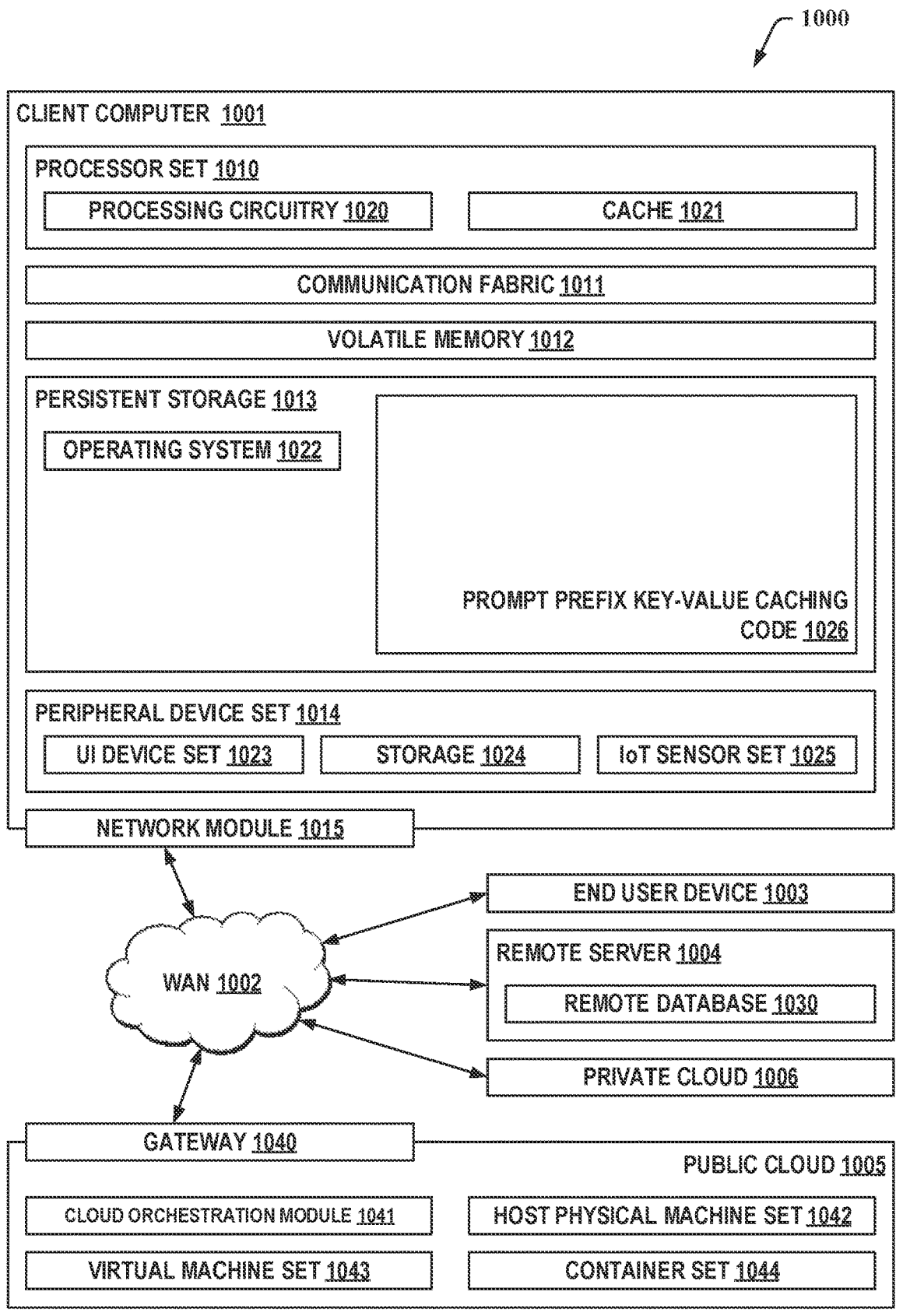
FIG. 10 illustrates a block diagram of an example, non-limiting operating environment in which one or more embodiments described herein can be facilitated.

FIG. 10 illustrates a block diagram of an example, non-limiting, operating environment in which one or more embodiments described herein can be facilitated. FIG. 10 and the following discussion are intended to provide a general description of a suitable operating environment 1000 in which one or more embodiments described herein at FIGS. 1-9 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as prompt prefix key-value caching code 1026. In addition to block 1026, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1026, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1026 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 1026 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer-executable components; and
   a processor that executes at least one of the computer-executable components that:
      accesses a request comprising a fixed prefix and variable data;

computes a temporal moving average as an average of a number of times the fixed prefix is accessed over a defined time period; and selectively stores in a cache, one or more key-value vectors generated via processing of the fixed prefix by a large language model (LLM), based on the temporal moving average of the fixed prefix being greater than a first defined threshold, according to a smart encoding policy, wherein the selective storing comprises:

based on the temporal moving average being greater than the first defined threshold, predicting, using a machine learning model that processes the fixed prefix, a first number of tokens generated via processing of the request by the LLM, determining a ratio of the first number of tokens to a token length of the fixed prefix, and storing the one or more key-value vectors in the cache based on the ratio being greater than a second defined threshold.

2. The system of claim 1, wherein the at least one of the computer-executable components further:

trains the machine learning model to predict the first number of tokens, wherein the training comprises:

accessing pairs of data points collected for a previous request comprising a previous fixed prefix and previous variable data, wherein each pair of data points of the pairs of data points includes a first data point representing a token length of the previous fixed prefix and a second data point representing a second number of tokens generated via processing of the previous request by the LLM; and training the machine learning model with the previous fixed prefix as input and the second number of tokens as an output, wherein the machine learning model is a regression model built on a sequence embedding model.

3. The system of claim 1, wherein the at least one of the computer-executable components further:

queries the fixed prefix against the cache to extract the one or more key-value vectors and that queries the fixed prefix against the LLM to generate the one or more key-value vectors if the one or more key-value vectors are missing from the cache.

4. The system of claim 1, wherein the at least one of the computer-executable components further:

inputs the one or more key-value vectors and the variable data into the LLM, wherein the LLM generates a response by processing the one or more key-value vectors and the variable data.

5. The system of claim 1, wherein storing the one or more key-value vectors reduces an amount of computation performed by an LLM-based pipeline employing the cache for subsequent requests comprising the fixed prefix and increases an inferencing speed of the LLM-based pipeline in proportion to a ratio of a token length of the fixed prefix to a token length of an output generated by the LLM-based pipeline.

6. The system of claim 1, wherein the at least one of the computer-executable components further:

configures the smart encoding policy according to a use case.

7. The system of claim 1, wherein storing the one or more key-value vectors in the cache employs positional encoding with the smart encoding policy.

8. The system of claim 1, wherein an application programming interface (API) explicitly defines a prefix field in the request to input the fixed prefix.

9. A computer-implemented method, comprising:

accessing, by a system operatively coupled to a processor, a request comprising a fixed prefix and variable data;

computing, by the system, a temporal moving average as an average of a number of times the fixed prefix is accessed over a defined time period; and selectively storing, by the system, in a cache, one or more key-value vectors generated via processing of the fixed prefix by an LLM, based on a temporal moving average of the fixed prefix being greater than a first defined threshold, according to a smart encoding policy, wherein the selective storing comprises:

accessing, in response to the temporal moving average being greater than the first defined threshold, a machine learning model that processes the fixed prefix to predict a first number of tokens generated via processing of the request by the LLM, computing a ratio of the first number of tokens to a token length of the fixed prefix, and storing the one or more key-value vectors in the cache in response to the ratio being greater than a second defined threshold.

10. The computer-implemented method of claim 9, further comprising:

training, by the system, the machine learning model to predict the first number of tokens, wherein the training comprises:

accessing, by the system, pairs of data points collected for a previous request comprising a previous fixed prefix and previous variable data, wherein each pair of data points of the pairs of data points includes a first data point representing a token length of the previous fixed prefix and a second data point representing a second number of tokens generated via processing of the previous request by the LLM; and training, by the system, the machine learning model with the previous fixed prefix as input and the second number of tokens as an output, wherein the machine learning model is a regression model built on a sequence embedding model.

11. The computer-implemented method of claim 9, further comprising:

querying, by the system, the fixed prefix against the cache to extract the one or more key-value vectors and that queries the fixed prefix against the LLM to generate the one or more key-value vectors if the one or more key-value vectors are missing from the cache.

12. The computer-implemented method of claim 9, further comprising:

inputting, by the system, the one or more key-value vectors and the variable data into the LLM, wherein the LLM generates a response by processing the one or more key-value vectors and the variable data.

13. The computer-implemented method of claim 9, wherein the storing the one or more key-value vectors reduces an amount of computation performed by an LLM-based pipeline employing the cache for subsequent requests comprising the fixed prefix and increases an inferencing speed of the LLM-based pipeline in proportion to a ratio of a token length of the fixed prefix to a token length of an output generated by the LLM-based pipeline.

14. The computer-implemented method of claim 9, further comprising:

configuring, by the system, the smart encoding policy according to a use case.

15. The computer-implemented method of claim 9, further comprising:

employing, by the system, positional encoding with the smart encoding policy to store the one or more key-value vectors in the cache.

16. The computer-implemented method of claim 9, wherein an API explicitly defines a prefix field in the request to input the fixed prefix.

17. A computer program product for speeding up an LLM service with inference caching, the computer program product comprising a non-transitory computer readable medium having program instructions embodied therewith, the program instructions executable by a processor to cause the processor to:

access a request comprising a fixed prefix and variable data; and compute a temporal moving average as an average of a number of times the fixed prefix is accessed over a defined time period; and store, in a cache, one or more key-value vectors generated via processing of the fixed prefix by an LLM, based on a temporal moving average of the fixed prefix being greater than a first defined threshold, according to a smart encoding policy, wherein the selective storing comprises:

accessing, in response to the temporal moving average being greater than the first defined threshold, a machine learning model that processes the fixed prefix to predict a first number of tokens generated via processing of the request by the LLM, computing a ratio of the first number of tokens to a token length of the fixed prefix, and storing the one or more key-value vectors in the cache in response to the ratio being greater than a second defined threshold.

18. The computer program product of claim 17, wherein the program instructions are further executable by the processor to cause the processor to:

train the machine learning model to predict the first number of tokens, wherein the training comprises:

accessing pairs of data points collected for a previous request comprising a previous fixed prefix and previous variable data, wherein each pair of data points of the pairs of data points includes a first data point representing a token length of the previous fixed prefix and a second data point representing a second number of tokens generated via processing of the previous request by the LLM; and training the machine learning model with the previous fixed prefix as input and the second number of tokens as an output, wherein the machine learning model is a regression model built on a sequence embedding model.

19. The computer program product of claim 17, wherein the program instructions are further executable by the processor to cause the processor to:

query the fixed prefix against the cache to extract the one or more key-value vectors and that queries the fixed prefix against the LLM to generate the one or more key-value vectors if the one or more key-value vectors are missing from the cache.

20. The computer program product of claim 17, wherein the program instructions are further executable by the processor to cause the processor to:

input the one or more key-value vectors and the variable data into the LLM, wherein the LLM generates a response by processing the one or more key-value vectors and the variable data.

* * * * *